Oct. 27, 1964   B. E. HOUSE ETAL   3,154,178
AUTOMATIC SLACK ADJUSTER
Filed June 1, 1962   2 Sheets-Sheet 2
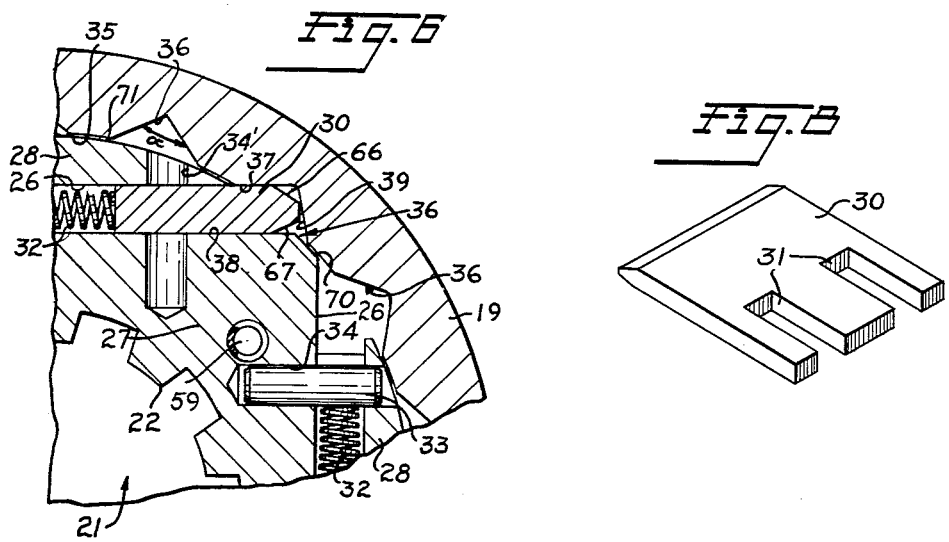
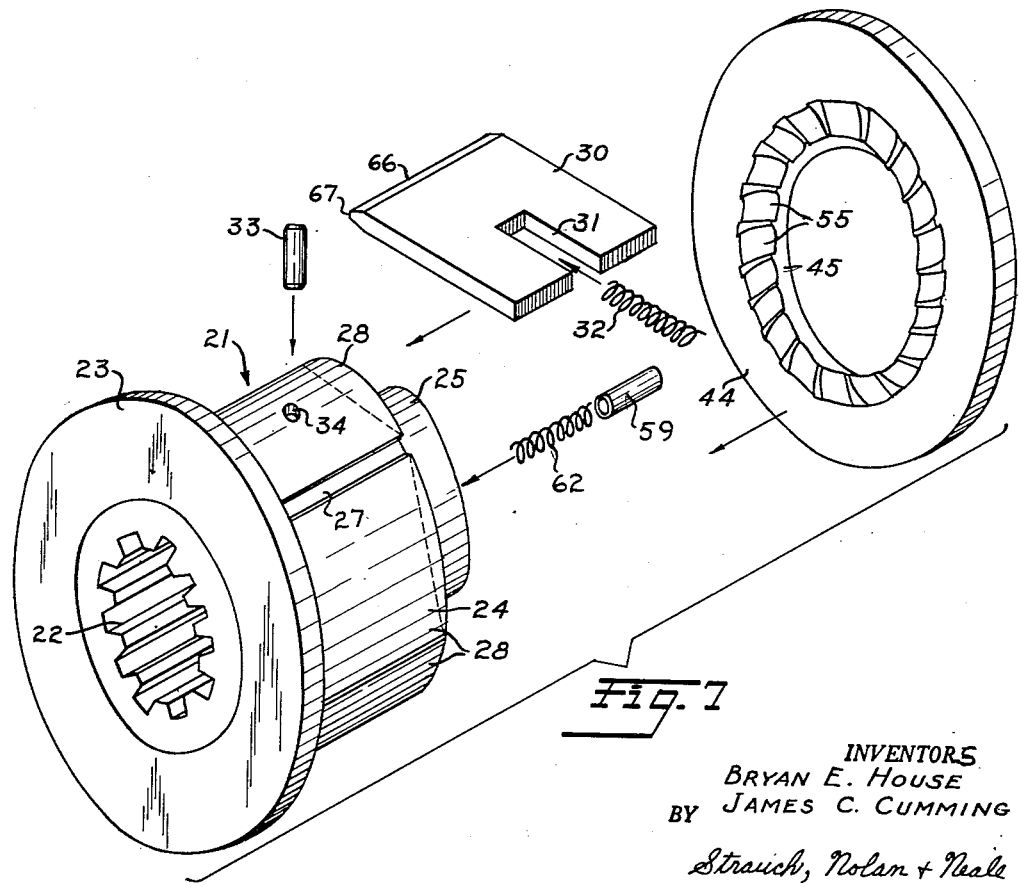
INVENTORS
BRYAN E. HOUSE
BY JAMES C. CUMMING
Strauch, Nolan + Neale
ATTORNEYS

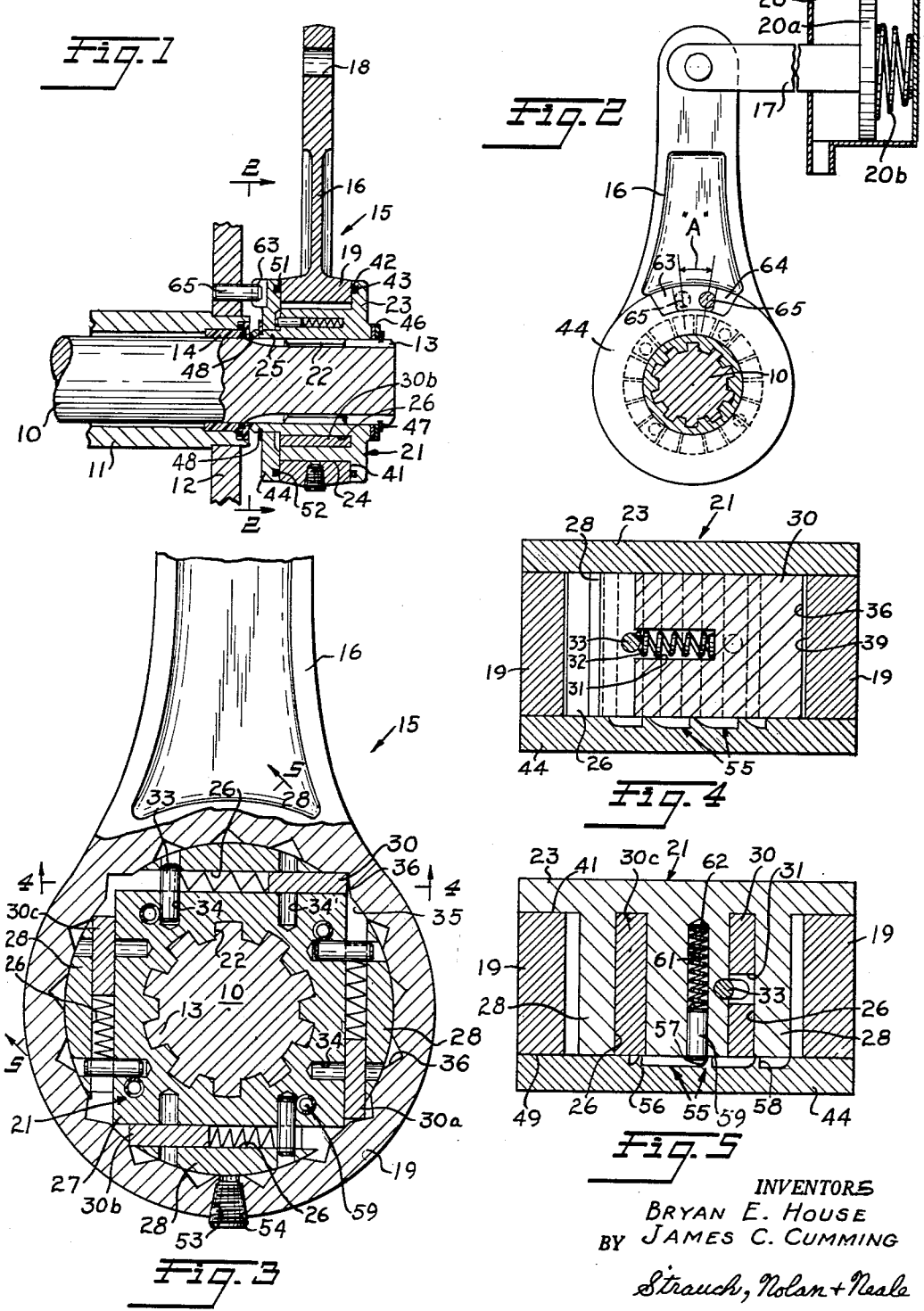

United States Patent Office 3,154,178
Patented Oct. 27, 1964

3,154,178
AUTOMATIC SLACK ADJUSTER
Bryan E. House, Algonac, and James C. Cumming, Pleasant Ridge, Mich., assignors to Rockwell-Standard Corporation, Coraopolis, Pa., a corporation of Pennsylvania
Filed June 1, 1962, Ser. No. 199,405
15 Claims. (Cl. 188—196)

This invention relates to vehicle braking mechanism and more particularly to an automatic slack adjusting arrangement of novel construction and mode of operation.

The invention is concerned essentially with a vehicle brake mechanism employing a rotatable brake shoe actuating cam, a lever being attached to the cam shaft and connected with a mechanical linkage or a fluid pressure operated motor to rock the lever and thus rock the cam shaft to apply the brakes. It has been proposed to install adjustable mechanism to manually vary the angular position of the cam shaft relative to the lever when the brake lining wears, so as to advance the retracted position of the brake shoes toward the drum to maintain the desired clearance between the lining and drum without changing the position of the lever so that the lever travel remains constant during brake actuation regardless of lining wear.

Some prior devices of this kind have embodied certain disadvantages in that they were excessively costly or too bulky to fit within the available space at the lever without necessarily enlarging the structure. This was true in the case of manual slack adjusters employing a worm and gear adjustment. Some prior automatic slack adjusters have incorporated a pawl and ratchet adjustment or axially opposed ratchet gears, which in many cases are very complicated and liable to destruction and excessive wear at the relatively fine teeth needed for small incremental adjustment. Some pawl and ratchet type adjusters do not operate properly and instantaneously or do not provide for normal brake drum expansion or distortion due to temporary heating, so that adjustment may occur upon such condition and the brake shoes may start to drag when the drum cools off and contracts toward the adjusted relaxed position of the shoes. Another serious deficiency in prior art devices was that the adjusting mechanism could not effectively be sealed to retain the lubricant and prevent entry of dirt and moisture, so that corrosion soon started eventually rendering the mechanism unusable and the abrasive effect of dirt particles increased wear on the moving parts. Furthermore, under cold weather conditions, moisture, entering the mechanism, could freeze and thereby rupture or completely inactivate the mechanism. Still a further disadvantage in prior art slack adjuster devices was that they usually were not interchangeable for either left or right hand application or either direction of rotation.

The mechanism of the present invention eliminates the foregoing disadvantages to a large degree.

Accordingly, it is a primary object of the present invention to provide a novel slack adjuster in a vehicle brake mechanism which is wholly automatic in operation and provides constant precise adjustment through 360° of relative rotation of the lever and cam shaft.

Another object of the invention is the provision of an automatic slack adjuster mechanism which is wholly enclosed, stocked with lubricant and sealed and needs only a minimum of maintenance.

A further object of the invention resides in the provision of an automatic slack adjuster mechanism which is interchangeable for either direction of rotation or either right or left hand application.

Another object of the invention is the provision of a novel automatic slack adjuster mechanism embodying multiple spring loaded driving plates selectively engaging internal radial teeth or grooves in the hub of the lever for driving connection therewith in a number of relatively adjusted positions.

A still further object of the invention is the provision of an automatic slack adjuster mechanism embodying means to provide a constant free movement of the brake lever through a predetermined angular range without effecting actuation of the adjusting mechanism to maintain a constant clearance between the brake shoe linings and drum and compensating for brake drum distortion due to heating and application force.

Another object of the present invention is to provide a novel automatic slack adjuster which can be easily adapted to existing brake mechanism without any or only a minimum of alterations on the original vehicle brake structure.

A further object resides in the provision of an automatic slack adjusting mechanism composed of a number of identical parts which can be easily and economically manufactured and which are embodied in a structure easily assembled and disassembled and parts of which may be replaced or interchanged with a minimum of effort.

The above and other obvious objects and features will become more apparent by the following detailed description of a preferred embodiment in connection with the appended drawings in which:

FIGURE 1 is a fragmentary view mainly in axial section of a slack adjusting mechanism according to a preferred embodiment of the invention;

FIGURE 2 is an end elevation partly in section substantially along line 2—2 of FIGURE 1;

FIGURE 3 is an enlarged elevation mainly in radial section through the slack adjuster mechanism of FIGURE 1 showing internal structure;

FIGURE 4 is a section substantially along line 4—4 of FIGURE 3 showing a driving plate;

FIGURE 5 is a similar section on line 5—5 of FIGURE 3 showing the cooperating ratchet and pin association at the outer adjusting plate;

FIGURE 6 is an enlarged fragmentary section showing details including a beveled outer end on the adjusting plate of the adjusting mechanism;

FIGURE 7 is an exploded view of the main parts of the adjusting mechanism apart from the lever; and FIGURE 8 illustrates another embodiment of a driving plate to be used with the adjusting mechanism of FIGURE 1.

FIGURE 1 shows the mechanism applied to a vehicle brake assembly embodying a brake actuator cam shaft 10 extending through a relatively fixed cylindrical support 11 welded or otherwise secured rigidly to a bracket 12 that carries the power actuator. Cam shaft 10 is provided at its left end in FIGURE 1 with the usual actuator cam (not shown) which is adapted upon rocking about the shaft axis to spread the brake shoes of any well known brake mechanism (not shown) to apply the linings against the wheel mounted brake drum (not shown) in the usual manner. Further general operation and structure of the brake itself is not deemed necessary, except to point out that shaft 10 is mounted in the assembly for rocking movement about its longitudinal axis.

Shaft 10 is formed with splines 13 at its outer end, and a plastic self-sealing bearing member 14 adjacent the inner end of splines 13 provides bearing support for shaft 10 and seals off the interior of the tubular support 11.

Splines 13 are adapted to mount a slack adjuster assembly 15 comprising a lever 16 connected as by link 17 to a fluid pressure or like motor, so that upon rocking of lever 16 cam shaft 10 will be rocked about its axis.

Lever 16 is provided with one or more apertures 18 to which may be attached mechanical linkage 17 or the push rod of a power actuator to rock lever 16. Here the power actuator is a pneumatic motor 20 containing a piston 20a coupled to linkage 17 and a biasing return spring 20b. Lever 16 has a hollow hub 19.

The slack adjuster assembly 15 comprises an inner cylindrical drum member 21 seen in detail in FIGURE 7 which is internally formed with splines 22 interfitting with cam shaft splines 13 to non-rotatably mount member 21 on shaft 10. The outer end of cylindrical member 21 comprises a rigid annular flange 23 which extends radially beyond the cylindrical central part 24, and the inner end is a reduced diameter cylindrical portion 25 that extends towards this tubular support 11.

The central part 24 of cylindrical member 21 is provided with a number of slots 26 (four being shown in this instance) cut axially into cylindrical part 24 from the outer end along identical equally spaced chord lines and ending near the vicinity of the end flange 23. The slots 26 extend across central part 24 on chords at right angles and intersecting each other (FIGURES 3 and 7) so that a square section block 27 is formed in the center, separated by the slots 26 from respective segments 28 formed by the chordal slots 26. It will be understood and as seen from the drawings that the square block portion 27 and segments 28 are integrally united at the root of flange 23 so that the segments extend axially rigidly in radially spaced relation to block 27 and in circumferentially spaced relation to each other.

Slots 26 slidably receive driving plates 30, 30a, 30b and 30c adapted for limited sliding movement outwardly in the slots. Plates 30 are provided with longitudinal slots 31 (FIGURE 7) to receive and guide coil springs 32 which in the assembly (FIGURES 1 and 4) abut against fixed pins 33 inserted in provided blind bores 34 drilled radially from the cylindrical outer surface of the central part 24. Bores 34 extend through segments 28 into block 27 as shown, and springs 32 are of such diameter as to fit easily within slots 31. Also, the diameter of each pin 33 is less than the width of associated slot 31 so that plates 30 (FIGURE 4) may move inward freely against the force of the coil compression springs 32 which normally urge the plates 30 constantly outwardly.

If it is desired to have plates 30 mounted in the slots 26 facing in the opposite direction of rotation, it is simply necessary to reverse plates 30 end for end and install the pins 33 in the other similar blind bores 34' at the opposite sides of the slots which may be provided for this purpose. This mounting of the plates 30 within the central part 24 will provide for opposite rotation of the lever 16 as will appear.

Lever hub 19 has an open-ended cylindrical bore 35 rotatably mounted on the cylindrical center part 24 of member 21, and driving plates 30 provide a special unidirectional motion transmitting connection between lever 16 and the cam shaft 10. Interiorly lever hub bore 35 is formed with a series of equally spaced similar parallel longitudinal detent grooves 36 the straight sides of which intersect at an angle slightly greater than a right angle. The number, size and circumferential spacing of these grooves 36 are such that, in essentially all relative positions of rotation of the lever 16 and member 21, one of the spring biased plates 30 will have its outer end edge fully received within one groove 36, as shown for the upper plate 30 in FIGURE 3. It will be noted that the other plates 30a, 30b, and 30c are not so seated in a groove 36.

With special reference to FIGURE 6 which shows the engagement between flat plate 30 and the lever hub enlarged, it will be seen that the outer (right) end of plate 30 is solidly interposed between a flat side 37 of associated groove 36 and the flat bottom surface 38 of associated groove 26, thus establishing a solid positive motion transmitting connection between the parts 27 and 19 should the lever 16 be rocked clockwise in FIGURES 3 or 6. Outward displacement of plate 30 is, of course, limited by abutment with the other side 39 of groove 36.

Should lever 16 be rocked counterclockwise in FIGURES 3 and 6, it will rock the cam shaft in the return direction, but should a certain amount of resistance to turning be encountered, the inclined other side 39 of groove 36 will so coact with the end of plate 30 with a camming action that driving plate 30 will be displaced inwardly, to the left in FIGURE 3, against the force of spring 32 until it is no longer drivingly disposed between the hub 19 and part 27 and then the lever may rock relatively to the shaft 10 as will appear.

As shown in FIGURE 1 the axial length of lever hub 19 is equal to the axial length of center part 24 of member 21 on which it is rotatably mounted, so that one annular flat side surface 41 of the hub slidably rotatably engages the corresponding flat annular inner surface of flange 23 and one of these surfaces is annularly grooved at 42 to receive an O-ring 43 of deformable material under axial compression so as to provide a fluid tight radial seal between those surfaces.

An annular adjustment plate or ring 44 has a cylindrical bore 45 by which it is snugly rotatably mounted on the cylindrical end portion 25 of member 21. In the assembly, member 21 is axially held on splines 13 by a washer assembly 46 and snap ring 47. The adjustment plate 44 is axially retained on member 21 by a snap ring and groove assembly at 48. The annular hub end surface 49 is flat and slidably engaged with a similar surface on plate 44, and one of these surfaces is annularly grooved as at 51 to receive an axially compressed O-ring 52 of deformable material that provides a fluid tight radial seal between plate 44 and the end of hub 19.

An opening 53 may be provided in hub 19 for the introduction of lubricant, and this is normally closed by a threaded plug 54. Lubricant within hub 19 is retained by the seals at 43 and 52.

As its inner side and extending entirely around the periphery of bore 45, plate 44 is formed with a plurality of recessed teeth 55. Teeth 55 comprise ledges 56 which at one side are formed as a smooth radius or rise 57 and at the other side as a straight face 58 perpendicular to the plate surface. A plurality of pins 59 are slidably mounted in axial bores 61 in member 21 and spring biased outwardly by coiled compression springs 62 into engagement with teeth 55.

Four of these pins 59 are illustrated but any number can be provided as needed or desired. Pins 59 are eccentric on the same radius with respect to the axis of rotation of shaft 10, FIGURE 3, and are preferably equally spaced circumferentially. Thus, it will be seen that when the lever 16 is turned in one direction any one or all of the four pins 59 abutting a ledge 56 as shown in FIGURE 5 drivingly connects the adjustment plate 44 to be rotated therewith but, if the plate 44 should be forcibly retained from further rotation, the pins 59 are free to override the teeth 56 (FIGURE 5) by riding up the radius side 57 of the teeth. If lever 16 is turned in the other direction, pins 59 after a predetermined travel along teeth 55 will abut straight tooth face 58 so that plate 44 will now be solidly connected to rotate with member 21, for a purpose to appear. Rotation of adjustment plate 44 is limited to a definite angle by the provision of rigid spaced external abutment bosses 63 and 64 on plate 44 (FIGURES 1 and 2) between which extends a fixed pin 65 secured on bracket 12.

In the inactive position of the slack adjuster one of the abutments 63 or 64 abuts pin 65 (FIGURE 2) depending on direction of rotation of lever 16, and the distance A through which plate 44 may be rotated until the pin 65 abuts the opposite abutment provides that this adjustment remains undisturbed within the range of this limited angular movement of the lever 16 in order to provide a constant clearance between the brake shoe linings and brake drum. This also takes into account the normal brake drum expansion due to heat dissipation and the normal drum distortion.

Other means to deter the rotation of the adjusting plate 44 to provide constant brake clearances apart from that illustrated and described may be employed as will be obvious and as may be dictated by individual requirements.

FIGURE 1 shows the outer ends of plates 30 as square cornered and substantially filling the grooves 36, but as shown in FIGURES 6 and 7, the outer ends of these plates 30 may preferably be chamfered as at 66, 67 to reduce the danger of accidental rubbing and locking This chamfering does not affect the motion transmitting function of plate 30 since this takes place effectively through the flat surfaces engaged over considerable area when plate 30 is in the FIGURE 6 position clamped between one side of a groove 36 and the bottom of slot 26.

Also, as shown in FIGURE 8, these slidable plates 30 may be provided with two or more parallel slots 31. This would require duplicate pins 33 and springs 32, and an advantage of this structure is that there would be no tendency of the plate to rock in its plane.

Operation

The angular position of the cam shaft 10 determines the outwardly displaced position of the usual brake shoes toward the drum, and the usual brake return spring tensioned between the shoes pulls the shoes into operative engagement with the cam, so that the angular position of the cam shaft when the brakes are released determines the lining to drum clearance. By turning lever 16 in the brake applying direction (clockwise in FIGURES 2 and 3), as by admitting air under pressure to the left side of piston 20a, lever hub 19 is connected in solid motion transmitting relation through a spring loaded radial driving plate 30 as shown in FIGURE 3 to drive drum member 21 which in turn, due to the splined connection at 13, rocks cam shaft 10 clockwise from its initial position. Simultaneously adjustment plate 44 is turned along with member 21 by an axial pin 59 engaging a tooth 55 of the adjustment plate 44 at the left end at radius 57 in FIGURE 5.

If the brake linings are new or unworn, the distance A between abutments 63 and 64 through which plate 44 is allowed to rotate with lever 16 is sufficient to effectively apply the brake shoes to the drum, and upon release of the lever 16 as by exhausting the air from the left side of piston 20a, the cam shaft 10 is returned to initial position by spring 20b without affecting the adjusting mechanism, that is without changing the relative angularity of shaft 10 and lever 16.

However, if lining wear has taken place, to effectively apply the brakes, lever 16 must be rotated through a greater angular distance than that indicated at A. When plate 44, which rotates with the lever, rocks sufficiently for abutment 63 to engage stop pin 65, plate 44 is prevented from further movement along with the lever hub 19, and spring loaded pins 59 override or ratchet over the teeth 55 so that while cam shaft 10 will continue to move the necessary amount in the brake applying direction, adjustment plate 44 now is held stationary with bracket 12.

After the brakes are released, the entire assembly 15 turns in the opposite direction under the power of expanding spring 20b. Now the adjustment plate 44 is picked up to rock counterclockwise with lever hub 19 by a pin 59 abutting a straight tooth face 58. However, after plate 44 rocks through the angle A, plate abutment 64 now engages stop pin 65 and further counterclockwise rotation of the adjustment plate 44 is stopped. The pins 59, which engage now stationary adjustment plate 44 at straight tooth sides 58, now act to prevent further rotation of drum member 21 and thereby prevent further return rocking of cam shaft 10.

The pins 59 can not override face 58 as they could on the radius side 57 of the teeth 55. This stops return rocking of the cam shaft 10 in a predetermined advanced position, by virtue of which the brake shoes will likewise assume an adjusted advanced position towards the brake drum and the normal brake shoe to drum clearance will again be established. Lever 16, however, continues to move counterclockwise and returns all the way to its initial position under power of the motor spring 20b because of the ability of the grooves 36 to ratchet over the edges of driving plates 30 during such reverse rotation, and when it returns to that position the driving connection to shaft 10 is again established as a driving plate 30 snaps into engagement with a hub groove 36.

The foregoing adjustment cycle will be repeated continuously and automatically during the life of the brake lining each time the normal actuating distance A is exceeded in rocking movement of lever 16 until the brake linings are entirely worn off, whereupon the brakes have to be relined. Lever 16 always returns to its initial brake release position no matter how great a degree of angular adjustment is made of shaft 10, so that the lever stroke always remains constant to apply the linings to the drum, and no matter what amount of adjustment has to be made there will always be an immediately effective positive driving connection in the brake applying direction between the lever hub 19 and member 21 due to the multiple arrangement of the driving plates 30.

For a smoother operation and to reduce scratching of the edges of the driving plates 30 on the groove edges at 36, it is preferred to have both outer edges of the plate 30 chamfered as at 66 and 67 as above described. Likewise, the four corners of the central square block 27 formed by the chordal slots 26 will preferably be chamfered as at 70 (FIGURE 6), so that, upon reverse rotation of the lever hub 19 when the member 21 is held stationary the plates 31 will be depressed inwardly sufficiently so that their chamfered edges 66 align with the edges 70 of the block to be substantially tangential to the radial outer surface of the central section 24 of member 21. This greatly reduces shearing stresses on the parts when the grooves 36 ratchet over the plates 30 and this prevents chafing or scratching at sharp corners.

The sharp side edges of the grooves 36 indicated at 71 in FIGURE 6 which are formed during machining are likewise smoothed, which can be conveniently done by an abrasive device to further enhance the smooth operation of this device. The included angle $\alpha$ between the sides of a groove 36 is preferably more than 90° but less than 110°, so that under driving conditions the driving side 37 of a groove 36 substantially completely abuts the coextensive upper flat smooth surface of the engaged plate 30 for maximum area driving contact. If this included angle is less tan 90°, only an edge of the groove would engage the plate 30 thus creating undesirable localized stresses along a relatively small area only. Enlarging the included angle beyond 110° may cause the plates 30 to be contacted at their edges only and creating the same stress problem and this in addition bears the danger that slip may occur.

The exploded view of FIGURE 7 illustrates the mode of assembly of the parts in sequence, one unit each of the driving plate assemblies and adjusting plate pins being shown, it being understood that the remaining plate assemblies and adjusting plate pins are essentially identical. The illustration also clearly shows the relative simplicity of the assembly and the few identical reversible and interchangeable parts involved which can be easily and inexpensively manufactured. The present mechanism is adaptable for either left or right hand operation and the parts are interchangeable with exception of the adjusting plate 44 which must be different for each application.

Thus, there has been provided a wholly automatic slack adjuster which is very effective, accurate and dependable and which can be manufactured economically, easily assembled and installed and requires no maintenance. The lubrication arrangement is usually enough for the life of the device. The novel slack adjuster corresponds in size and weight to the conventional manually adjustable slack adjuster and can replace the same in existing brake installations. The vital parts of the adjusting mechanism are wholly enclosed, lubricated and effectively sealed to protect the assembly against corrosion and other damages. Parts of this novel slack adjuster may be easily interchanged or reversed to make it applicable to either direction of rotation or left hand and right hand applications, depending the brakes to be equipped.

The present invention may be embodied in other specific form without departing from the essential characteristic and spirit thereof, the present embodiment, therefore, is to be considered in all respects as illustrative only and not restrictive, the scope of the invention being indicated by the appended claims rather than by the foregoing description.

What is claimed and desired to be secured by Letters Patent is:

1. An automatic slack adjuster for a vehicle brake mechanism comprising a cam shaft having an initial brake released position mounted for rocking movement about its axis, a lever rotatably mounted on said shaft and having an initial position, means providing a cam shaft rocking drive connection between the lever and said shaft which is always substantially positive when the lever is moved in the brake applying direction and which is releasable upon encountering resistance of a predetermined torque when the lever is moved in the brake release direction, means for selectively moving said lever in brake applying or brake release directions, coupling means in said drive connection automatically effective when said lever has been moved through more than a predetermined angular distance in the brake applying direction and released for return movement for arresting return rocking movement of said cam shaft while permitting said return movement of said lever to its said initial position, and cooperating means on said lever and said coupling means enclosing said drive connection.

2. An automatic slack adjuster for a vehicle brake mechanism comprising a cam shaft having an initial brake released position mounted for rocking movement about its axis, a lever rotatably mounted on said shaft and having an initial position, means providing a cam shaft rocking drive connection between the lever and said shaft which is always substantially solid when the lever is moved in the brake applying direction and which is releasable upon encountering resistance of a predetermined torque when the lever is moved in the brake release direction, means for selectively moving said lever in brake applying or brake release directions, a coupling element in said connection non-rotatably mounted on said shaft, an adjustment member rotatably mounted on said coupling element and movable with said lever, means for arresting movement of said adjustment member but permitting continued movement of the lever in the brake applying direction after said lever has moved through a predetermined angle, means for returning said adjustment member in the opposite direction along with said lever during brake release movement of said lever, means for arresting said return movement of said adjustment member after it has moved through said angle while permitting return of said lever to its said initial position, means positively locking said coupling element to said adjustment member during said return movement of said adjustment member and effective when return movement of said adjustment member has been arrested for arresting return rotation of said cam shaft in a new brake release position, and cooperating means on said lever, coupling element and adjustment member enclosing said drive connection.

3. In a slack adjuster for a brake assembly, a rockably mounted cam shaft assembly, a lever having a hollow hub rotatably mounted on said shaft assembly, means providing a series of longitudinal grooves around the interior of said hub, and a plurality of plates independently slidably mounted on said shaft assembly within said hub, means spring biasing said plates outwardly toward said grooves to provide a motion transmitting interlock between said lever and shaft assembly in a number of different relative positions of rotation of the lever and shaft assembly when said lever is moved from an initial position in the brake applying direction, and means automatically effective when said lever has moved through more than a predetermined angular distance in said brake applying direction and released for return rocking movement of said cam shaft for arresting return rocking movement of said cam shaft, with said motion transmitting interlock permitting relative angular movement between said lever and cam shaft to permit return of said lever to said initial position.

4. In the slack adjuster defined in claim 3, said plates being mounted for sliding movement chordally of said shaft assembly.

5. In the slack adjuster defined in claim 3, slots in said shaft assembly slidably guiding said plates.

6. In a slack adjuster for a brake assembly, a rockably mounted cam shaft, a drum non-rotatably mounted on said shaft, a lever having a hollow hub rotatably mounted on said drum, means providing a uniformly spaced series of longitudinal grooves around the interior of said hub, a plurality of flat sided plates independently slidably mounted on said drum within said hub, means spring biasing said plates outwardly toward said grooves to provide a motion transmitting interlock between said lever and shaft in a number of different relative positions of rotation of the lever and shaft, said grooves having flat sides inclined at more than 90° and being adapted to receive the outer ends of said plates when said lever is moved from an initial position in the brake applying direction, and means automatically effective when said lever has moved through more than a predetermined angular distance in said brake applying direction and released for return rocking movement of said cam shaft for arresting return rocking movement of said cam shaft, with said motion transmitting interlock permitting relative angular movement between said lever and cam shaft to permit return of said lever to said initial position.

7. In the slack adjuster defined in claim 6, said groove sides being inclined at an angle of less than 110°.

8. In the slack adjuster defined in claim 6, said drum having a plurality of axially extending slots that also extend at right angles to a radius of said drum for receiving and guiding said plates, and said spring biasing means being in said slots.

9. In the slack adjuster defined in claim 8, the outer ends of each of said plates being adapted for opposite flat side engagement with the bottom of its slot and one side of an associated hub groove.

10. A brake actuation structure comprising a cam shaft assembly rockable about its longitudinal axis, a lever having a hollow hub rotatably mounted on said shaft assembly, a plurality of longitudinally extending grooves within said hub, a plurality of driving plates slidably mounted within said shaft assembly and spring biased outwardly toward said hub grooves, at least one of said plates providing a solid drive connection between the lever and shaft assembly when said lever is rocked in the brake applying direction and a releasable drive connection when the lever is rocked in the brake release direction, an adjustment ring rotatably mounted on said shaft assembly, an annular row of teeth on said ring, at least one axially slidable spring biased member on said shaft assembly adapted to engage said teeth, and means for limiting angular rotation of said adjustment ring, said member and teeth providing a releasable drive connection between the shaft assembly and ring when said lever is rocked in the brake applying direction and being adapted to lock the shaft assembly against rotation relative to the ring during rotation of the lever in the brake release direction.

11. A brake assembly comprising a cam shaft rockable about its longitudinal axis, a cylindrical drum non-rotatably mounted on said shaft, a lever having a hollow hub rotatably mounted on said drum, a plurality of longitudinally extending grooves within said hub, a plurality of driving plates slidably mounted chordally within said drum and spring biased outwardly toward said hub grooves, said plates providing a solid drive connection between the lever and drum when said lever is rocked in the brake applying direction and a releasable drive connection when the lever is rocked in the brake release direction, an adjustment ring rotatably mounted on said drum, an annular row of teeth on said ring, an axially slidable spring biased member on said drum adapted to engage said teeth, and means for limiting angular rotation of said adjustment ring, said member and teeth providing a releasable drive connection between the drum and ring when said lever is rocked in the brake applying direction and being adapted to lock the drum against rotation relative to the ring during rotation of the lever in the brake release direction.

12. In the brake assembly defined in claim 11, said drum having an end flange and successively smaller diameter portions for mounting said lever hub and said ring, the portion adjacent the flange being formed with slots for slidably mounting said plates and said slots being open axially opposite the flange, and the opposite ends of said lever hub being engaged in radially sealed rotatable contact with said flange and said ring respectively.

13. In a slack adjuster for a brake assembly, a rockably mounted cam shaft assembly, a lever having a hollow hub rotatably mounted on said shaft assembly, means providing a series of longitudinal grooves around the interior of said hub, and a plurality of plates independently slidably mounted in chordal slots in said shaft assembly within said hub, means spring biasing said plates outwardly toward said grooves to provide a motion transmitting interlock between said lever and shaft assembly in a number of different relative positions of rotation of the lever and shaft assembly when said lever is moved from an initial position in the brake applying direction, means automatically effective when said lever has moved through more than a predetermined angular distance in said brake applying direction and released for return rocking movement of said cam shaft for arresting return rocking movement of said cam shaft, with said motion transmitting interlock permitting relative angular movement between said lever and cam shaft to permit return of said lever to said initial position, and means for optionally reversibly mounting said plates in said slots for adapting said adjuster to reversible actuation of said lever.

14. A brake assembly comprising a cam shaft rockable about its longitudinal axis, a drum non-rotatably mounted on said shaft and having a radial flange, a lever having a hollow hub rotatably mounted on said drum with one end rotatably engaging said flange, a plurality of longitudinally extending grooves within said hub, a plurality of driving plates slidably mounted within said drum and spring biased outwardly toward said hub grooves, said plates providing a solid drive connection between the lever and drum when said lever is rocked in the brake applying direction and a releasable drive connection when the lever is rocked in the brake release direction, an annular adjustment plate rotatably mounted on said drum in rotatable engagement with the other side of said hub, a row of internal teeth on the side of said plate disposed radially inwardly of said hub, axially slidable spring biased member on said drum adapted to engage said teeth, and means for limiting angular rotation of said adjustment plate, said members and teeth providing a releasable drive connection between the drum and plate when said lever is rocked in the brake applying direction and being adapted to lock the drum against rotation relative to the adjustment plate during rotation of the lever in the brake release direction.

15. In the brake assembly defined in claim 14, a tubular cam shaft support having an opening through which said cam shaft extends into said drum, and an annular plastic self-sealing bearing member at the end of said tubular support around said opening.

References Cited in the file of this patent
UNITED STATES PATENTS
2,109,284    Brinck et al. _____ Feb. 22, 1938